United States Patent
Castille et al.

(10) Patent No.: US 10,625,345 B1
(45) Date of Patent: Apr. 21, 2020

(54) METHOD AND APPARATUS FOR REPAIR DRILL PIPE AND OTHER TUBULAR GOODS, INCLUDING THREADED CONNECTIONS THEREOF

(71) Applicant: Superior Inspection Services, LLC, Broussard, LA (US)

(72) Inventors: Dale J. Castille, Lafayette, LA (US); Charles Sewell, Lafayette, LA (US)

(73) Assignee: Superior Inspection Services, LLC, Broussard, LA (US)

( * ) Notice: Subject to any disclaimer, the term of this patent is extended or adjusted under 35 U.S.C. 154(b) by 0 days.

(21) Appl. No.: 16/126,343

(22) Filed: Sep. 10, 2018

Related U.S. Application Data (60) Provisional application No. 62/556,737, filed on Sep. 11, 2017.

(51) Int. Cl.
 *B23B 5/16* (2006.01)
 *F16L 55/18* (2006.01)

(52) U.S. Cl.
 CPC .............. *B23B 5/163* (2013.01); *F16L 55/18* (2013.01)

(58) Field of Classification Search
 CPC ...... F16L 55/18; B23B 5/163; B23B 2215/72; B23B 2215/68; B23B 2260/116; B23B 2270/08
 See application file for complete search history.

(56) References Cited

U.S. PATENT DOCUMENTS

| | | | | |
|---|---|---|---|---|
| 3,691,882 | A * | 9/1972 | Massey | B23B 5/163 82/113 |
| 4,465,422 | A * | 8/1984 | Blust, Sr. | B23Q 1/76 408/45 |
| 2015/0090083 | A1* | 4/2015 | Conrad | B23B 5/08 82/47 |

* cited by examiner

*Primary Examiner* — Alan Snyder
(74) *Attorney, Agent, or Firm* — Ted M. Anthony (57) ABSTRACT

A re-facing apparatus for pipe threaded connections having independent machining stations for pin-end (male) and box-end (female) threaded connections. Among other benefits, the machining stations can be used to restore torque shoulders by machining a face of each shoulder using custom spindle and cross slides. The pipe connection re-facing apparatus can be set up over existing pipe racks and allows pipe sections to be rolled through for processing. For example, the apparatus of the present invention can be installed and utilized in proximity to a pipe storage and inspection facility, such that out-of-specification pipe connections can be re-faced without incurring significant transportation and/or machine shop expenses.

17 Claims, 9 Drawing Sheets

METHOD AND APPARATUS FOR REPAIR DRILL PIPE AND OTHER TUBULAR GOODS, INCLUDING THREADED CONNECTIONS THEREOF

CROSS REFERENCES TO RELATED APPLICATION

This application claims priority of U.S. Provisional Patent Application Ser. No. 62/556,737, filed Sep. 11, 2017, incorporated herein by reference.

STATEMENTS AS TO THE RIGHTS TO THE INVENTION MADE UNDER FEDERALLY SPONSORED RESEARCH AND DEVELOPMENT

None

BACKGROUND OF THE INVENTION

1. Field of the Invention

The present invention pertains to a method and apparatus for repairing and/or re-facing threaded connections on drill pipe and other tubular goods. More particularly, the present invention pertains to a method and apparatus for repairing and/or re-facing threads of threaded tubular goods of virtually any size or thread dimension. More particularly still, the present invention pertains to a method and apparatus for repairing and/or re-facing threaded connections of threaded tubular goods at a pipe storage or inspection facility, thereby eliminating the need to transport to, and handle such pipe at, a machine shop or other off-site facility.

2. Brief Description of the Prior Art

Pipe and other tubular members, such as those used in oilfield applications, in particular, are typically joined together in end-to-end orientation using mating threaded connection members. For example, such threaded connections are frequently used to join sections of drill pipe and other related assemblies together. Typically, such threaded connections include opposing shoulders, also referred to as faces and/or seals, that are compressed together by mating threads when pipe sections are joined together. When threaded connection members are joined, said opposing connection shoulders provide strength and integrity to said threaded connection, and also provide a fluid pressure seal for fluid contained within the inner through bore of the pipe.

Typically, a conventional threaded pipe connection (i.e., a male or "pin" end connection member and a mating female or "box" end connection member) has at least one face/seal section. Said face/seal portion of each connection member must be substantially smooth in order to mate with, and engage against, an opposing seal section; if not, the face/seal section of a threaded connection can leak and result in a failure of said connection. In addition, over-torque of a threaded connection during connection or "make-up" operations can over-stress the mating threads, as well as any shoulders of opposing threaded connection members, which can also result in connection failure.

So-called high torque threaded connections were developed in order to overcome many of the disadvantages associated with conventional threaded connections. Such high torque connections include a plurality of seals, such as a primary seal and a secondary seal; the primary seal contacts the opposing threaded connection at substantially the same time as the secondary seal. Said secondary seal serves as a torque-stop that prevents the threaded connection from being over-tightened. However, due to the primary and secondary seal design in such high torque connections, it is critical that the dimensions of the opposing threaded connection members (including, without limitation, the distance or length between the primary seal to the secondary seal) must remain consistent.

In order for said threaded connections to function properly, seal faces of opposing threaded connection members must be smooth and oriented at desired predetermined angle(s) relative to thread direction in order to ensure proper performance. However, if a seal face is flawed or damaged with scratches, nicks, scarring or other irregularities, the damaged seal face generally must be repaired ("re-faced") prior to being used.

During use, threaded pipe connections are frequently repeatedly made-up (screwed together) and disconnected (unscrewed), resulting in repeated contact between opposing threaded connection members. No matter how much care is taken during such operations, such contact may cause undesirable scoring, nicks, scratches and/or other damage to such threaded connections including, without limitation, sealing shoulders thereof. Such damage, in turn, can negatively affect the functionality and performance of the threaded connections of such pipe. As a result, it is frequently beneficial to repair such pipe connection members prior to use (or re-use); such repair of threaded connection members is commonly referred to as "re-facing" said threads.

After pipe has been used in a well or as part of other operations, said pipe is typically transported to a pipe yard or other staging facility prior to reuse. In such cases, such pipe—and, the threaded connection members thereof, in particular—is inspected for flaws or damage. When damage to the threaded connection members is identified, the affected threaded pipe connection members must be repaired and/or reconditioned before the pipe can be reused.

Such reconditioning/repair is frequently performed using sand paper or similar abrasive material. However, such conventional sanding/abrasive processes can be imprecise and can yield less than satisfactory results. Additionally, applicable laws, rules and/or government regulations frequently prohibit the re-facing of threaded connection members using sand paper or other abrasives. As a result, threaded connection members are frequently repaired and/or re-faced using better-performing machining processes.

In such cases, pipe to be repaired and/or re-faced must be transported from a pipe yard or other staging facility to a machine shop or specialized facility where re-facing or other repair operations can be performed on said threaded connection members. Because said pipe sections are frequently thirty (30) feet or more in length, and often very heavy, transportation of said pipe sections to and from a machine shop can be an expensive, time consuming, dangerous and labor intensive process. Frequently, such pipe sections must be loaded onto trucks using fork lifts or other lifting means; this process alone greatly increases the risk of accidental personal injury or death.

Thus, there is a need for a means for repairing and/or re-facing threaded pipe connection members (including, without limitation, high torque drill pipe connection members) at a pipe storage facility, thereby eliminating the need for transporting such pipe to a distant or off-site location or facility.

SUMMARY OF THE INVENTION

In a preferred embodiment, the present invention comprises a threaded pipe connection repair (re-facing) assembly having independent pin (male) and box (female) machining stations; the present invention can be used to re-face and/or restore torque shoulders, seal surfaces and/or other components of said threaded connection members by machining the surface(s) of each threaded connection member using custom spindle and cross slide assemblies. In a preferred embodiment, the pipe connection re-facing apparatus can be installed and operated over existing pipe racks and allows individual pipe sections to be rolled through for repair/re-facing operations.

Although other embodiments can be envisioned without departing from the scope of the present invention, in a preferred embodiment the present invention can be utilized at pipe storage or staging areas, ideally where pipe and threaded connection inspection operations occur. For example, the apparatus of the present invention can be installed and utilized in proximity to a pipe inspection facility, such that out-of-specification pipe connections can be repaired locally at said facility without requiring transportation of pipe sections to an off-site machine shop, thereby eliminating significant transportation and/or machine shop (frequently third party) expenses.

In a preferred embodiment, pipe sections to be repaired are loaded onto pipe racks. Such pipe can be loaded and unloaded by hydraulic loading arms and rotated by supporting hydraulically driven cylindrical roller assemblies. Speed and torque are adjustable as required by pipe size and specifications. As a pipe section enters said re-facing apparatus, opposing hydraulically driven machining carriage members can engage with threaded (pin and box) connection members and perform such re-facing/repair operations.

Control panel(s) of the present invention permits efficient operation of the threaded pipe connection repair (re-facing) assembly of the present invention. In a preferred embodiment, separate pendant controls are provided for pin and box stations that use the same control legend plate. Said controls can be interlocked so that only one control or the other can be used at any particular time. All actions associated with the re-facing apparatus of the present invention are completed by using the appropriate control switches.

After a pipe section is properly positioned within the threaded pipe connection repair (re-facing) assembly of the present invention, threaded connection member faces (pin and/or box ends) can be separately repaired or re-faced; in a preferred embodiment, said repair is performed using a lathe-type apparatus equipped with carbide cutting tools well known to those having skill in the art. One or both ends can be repaired as desired. After said re-facing/repair operations have been completed, the pipe section can be re-inspected and/or rolled away for storage on pipe racks or re-use, as desired. The method and apparatus of the present invention can be used on virtually any size or configuration of pipe and other tubular goods including, without limitation, drill pipe having outer diameters of 2⅜" thru 6⅝" drill pipe (range 2 and 3).

The method and apparatus of the present invention can be placed in line with a pipe inspection and/or storage facility for repairing (re-facing) of threaded connection members without requiring pipe or other tubular goods to be transported to a machine shop or other off-site location for processing. In a preferred embodiment, a plurality of pipe sections (including, without limitation, those returning from prior use in the field) can be inspected; those sections requiring re-facing can be sent to the re-facing apparatus of the present invention for repair, while other sections passing inspection can be sent directly to storage.

The method and apparatus of the present invention reduces overall pipe re-facing/processing time by having pipe ready to be stored (and readily available for the next anticipated use), saves cost of transportation of tubular goods to and from a machine shop, as well as any necessary repairs at said machine shop, and enhances safety by eliminating the need for unnecessary loading and/or transportation of pipe sections to be repaired or re-faced.

BRIEF DESCRIPTION OF THE DRAWINGS

The foregoing summary, as well as any detailed description of the preferred embodiments, is better understood when read in conjunction with the drawings and figures contained herein. For the purpose of illustrating the invention, the drawings and figures show certain preferred embodiments. It is understood, however, that the invention is not limited to the specific methods and devices disclosed in such drawings or figures.

DETAILED DESCRIPTION OF A PREFERRED EMBODIMENT

Figure 1:
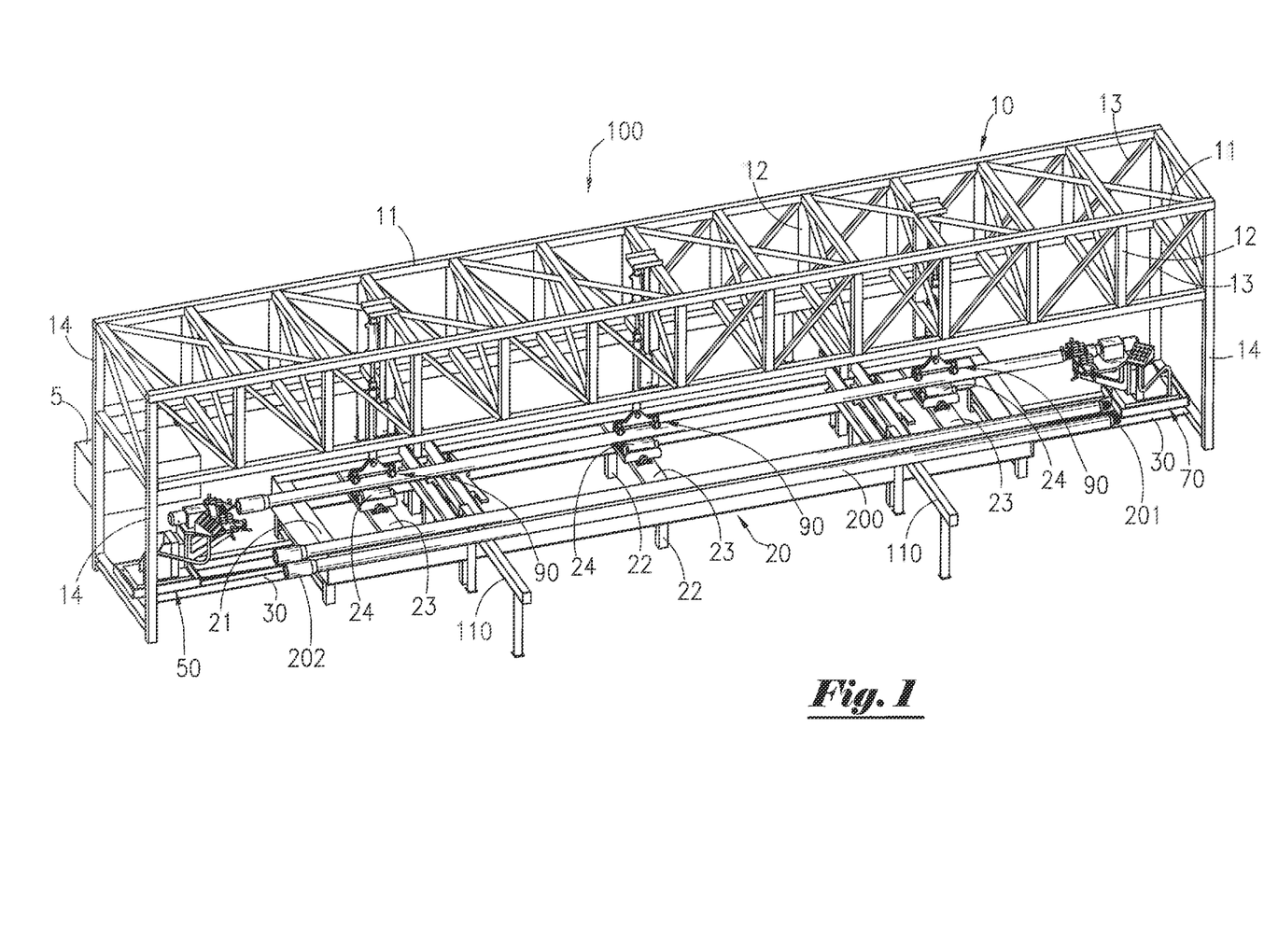
FIG. 1 depicts an overhead perspective view of the threaded pipe connection repair (re-facing) assembly of the present invention.

Referring to the drawings, FIG. 1 depicts an overhead perspective view of a threaded connection repair assembly 100 of the present invention for use on threaded drill pipe and/or other tubular goods. In a preferred embodiment, the present invention comprises a thread repair (re-facing) assembly having independent machining stations for pin-end (male) threaded connection members and box-end (female) threaded connection members.

Although other operations can be envisioned without departing from the scope of the present invention, said threaded connection repair assembly 100 can be used to restore or repair thread torque shoulders, seal surfaces and/or other components of said threaded connection members by machining the surface(s) of each threaded connection member using custom spindle and cross slide assemblies as more fully described herein. In a preferred embodiment, said threaded connection repair assembly 100 can be erected and operated in connection with existing pipe storage and/or inspection facilities, and allows individual pipe sections to be rolled through for repair/re-facing operations.

Still referring to FIG. 1, threaded connection repair assembly 100 generally comprises an elevated support truss assembly 10 constructed of structural members (typically tubular members, elongate beams or the like). In the embodiment depicted in FIG. 1, said support truss assembly 10 is constructed of horizontal structural beam members 11, vertical support beam members 12, diagonal cross members 13 and vertical leg members 14 that are joined to form an elevated support frame. Although the length and specific design parameters of support truss assembly 10 can vary, in the preferred embodiment said truss assembly 10 can be between 40 to 60 feet in length from end to end.

Work platform 20 having substantially flat upper surface 21 is disposed under, and oriented in substantial alignment with, said support truss assembly 10. In the embodiment depicted in FIG. 1, said work platform 20 comprises a table-like structure supported by a plurality of leg members 22; said leg members 22 can be sized to position said upper surface 21 a desired distance above a floor or other base upon which threaded connection repair assembly 100 is positioned. A plurality of cross supports 23 extend across said work platform 20; in a preferred embodiment, said cross supports 23 are oriented substantially perpendicular to the longitudinal axis of support truss assembly 10.

Lower rollers 24 are pivotally disposed on said cross supports 23. Upper clamp assemblies 90 are disposed above, and in general alignment with, said lower rollers 24. Said upper clamp assemblies 90 can be selectively raised and lowered relative to work platform 20, as more fully described herein. Hydraulic power unit 5 supplies hydraulic fluid to hydraulically-powered components of threaded connection repair assembly 100 of the present invention.

Elongate track members 30 extend from both ends of said work platform 20. In a preferred embodiment, said track members 30 are oriented substantially parallel to the longitudinal axis of work platform 20 and support truss assembly 10. Box-end machining assembly 50 is disposed on track members 30 at one end of said work platform 20, while pin-end machining assembly 70 is disposed at the opposite end of said work platform 20. It is to be observed that conventional loading of pipe sections in the assembly of the present invention will position the threaded female connection of said pipe section in proximity to box-end machining assembly 50, while the threaded male connection is positioned in proximity to pin-end machining assembly 70.

Figure 2:
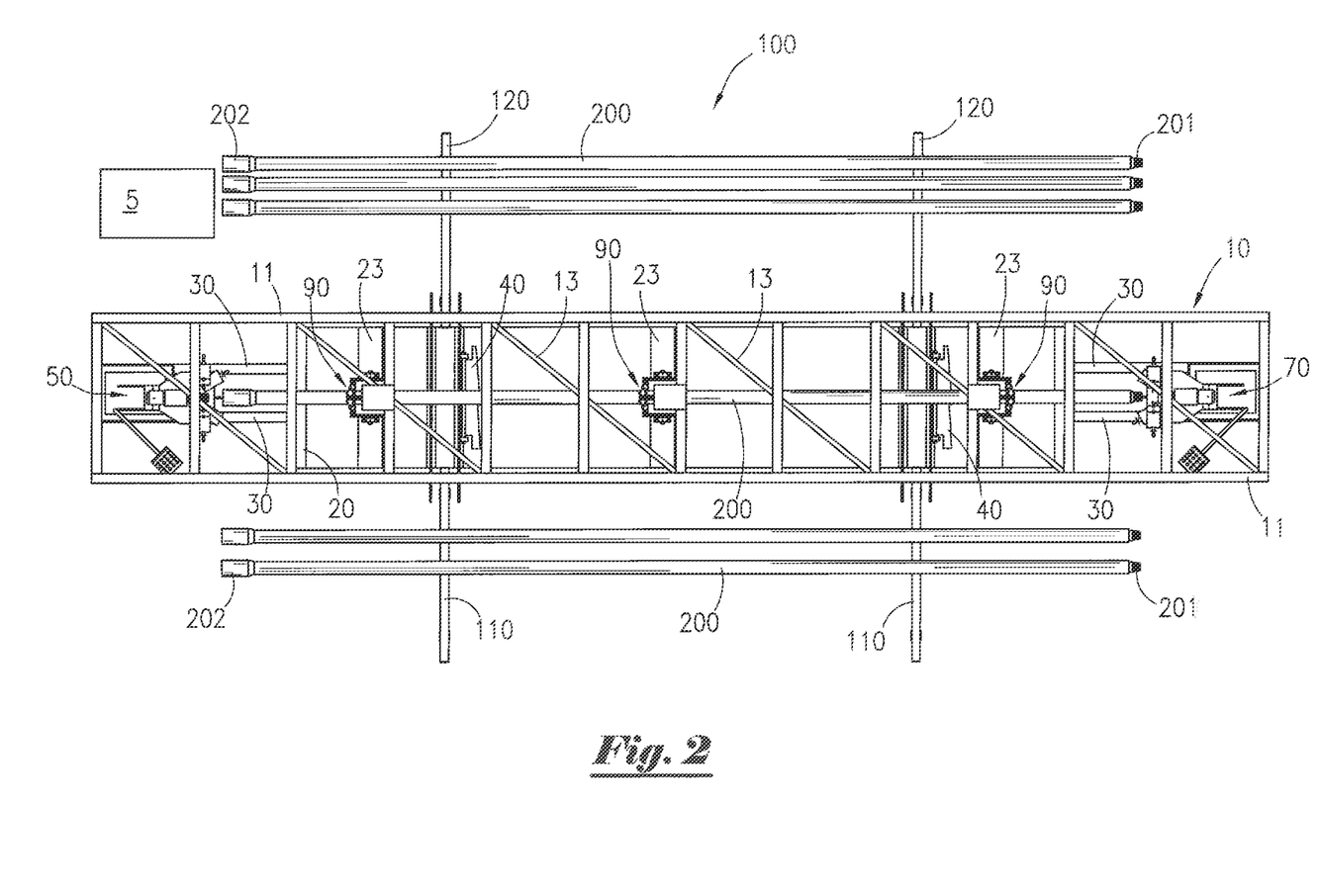
FIG. 2 depicts an overhead view of the threaded pipe connection repair (re-facing) assembly of the present invention.

FIG. 2 depicts an overhead view of the threaded connection repair assembly 100 of the present invention. Threaded connection repair assembly 100 generally comprises an elevated support truss assembly 10 constructed of structural members (typically tubular members, elongate beams or the like) including horizontal structural beam members 11 and diagonal cross members 13. Work platform 20 is disposed under, and oriented in substantial alignment with, said support truss assembly 10. A plurality of cross supports 23 extend across said work platform 20 and are oriented substantially perpendicular to the longitudinal axis of support truss assembly 10.

Adjustable upper clamp assemblies 90 are operationally attached to said support truss member 10 and can be selectively raised and lowered relative to work platform 20. Elongate track members 30 extend from both ends of said work platform 20. In a preferred embodiment, said track members 30 are oriented substantially parallel to the longitudinal axis of work platform 20 and support truss assembly 10. Box-end machining assembly 50 is disposed on track members 30 at one end of said work platform 20, while pin-end machining assembly 70 is disposed at the opposite end of said work platform 20. A hydraulic power unit 5 supplies hydraulic fluid to hydraulically-powered components of threaded connection repair assembly 100 of the present invention.

Input pipe racks 110 are positioned adjacent to table-like work platform 20. In a preferred embodiment, said pipe racks 110 are oriented substantially perpendicular to the longitudinal axis of said work platform 20 (and also the longitudinal axis of said support truss assembly 10). Similarly, output pipe racks 120 are positioned adjacent to table-like work platform 20. In a preferred embodiment, said output pipe racks 120 are also oriented substantially perpendicular to the longitudinal axis of said work platform 20 (and also the longitudinal axis of said support truss assembly 10).

As depicted in FIG. 2, a plurality of pipe joints 200, each having a pin-end (male) threaded connection member 201 at one end, and box-end (female) threaded connection member 202 at the opposite end, are disposed on the upper surface of said input pipe racks 110 and output pipe racks 120. Additionally, a single pipe joint 200 is disposed on work platform 20, under support truss assembly 10. In this configuration, it is to be observed that a plurality of pipe joints 200 needing repair or re-facing can be disposed on input pipe racks 110, a single pipe joint 200 disposed on work platform 20 can be repaired, and any pipe joints 200 that have already been repaired/re-faced can be disposed on output pipe racks 120.

Figure 3:
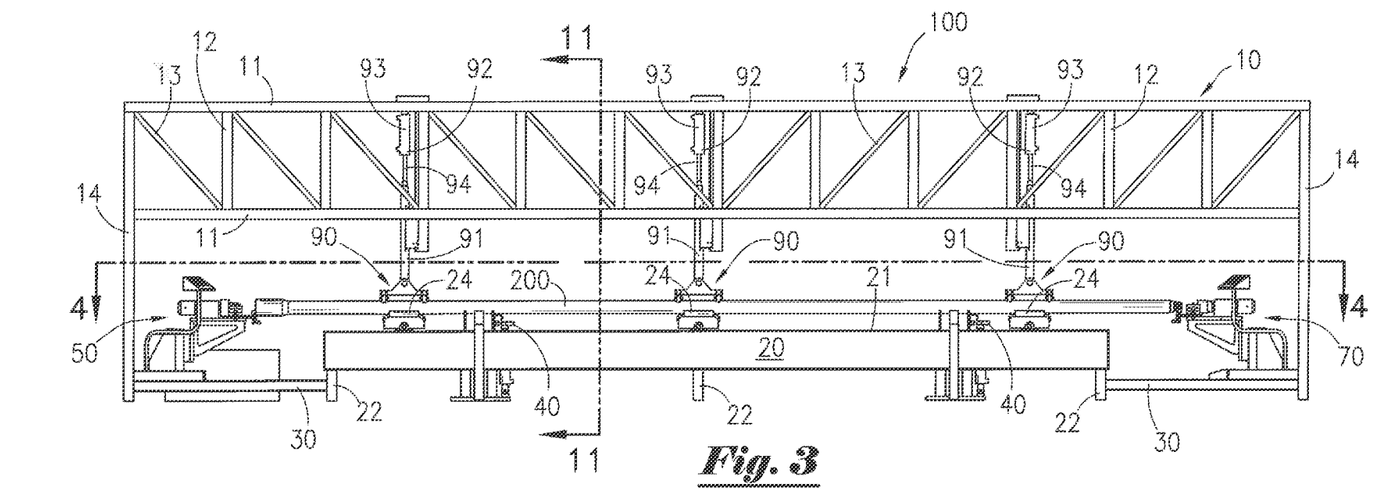
FIG. 3 depicts side view of the threaded pipe connection repair (re-facing) assembly of the present invention.

FIG. 3 depicts side view of threaded pipe connection repair (re-facing) assembly 100 of the present invention. Elevated support truss assembly 10 is generally comprises joined horizontal structural beam members 11, vertical support beam members 12, diagonal cross members 13 and vertical leg members 14 that form an elevated support frame. Although the length and specific design parameters of support truss assembly 10 can vary, in the preferred embodiment said truss assembly 10 can be between 40 to 60 feet in length from end to end.

Work platform 20 having substantially flat upper surface 21 is disposed under, and oriented in substantial alignment with, said support truss assembly 10. Work platform 20 comprises a table-like structure supported by a plurality of leg members 22; said leg members 22 can be sized to position said upper surface 21 a desired distance above a floor or other base upon which threaded connection repair assembly 100 is positioned. Lower rollers 24 are pivotally disposed on cross supports 23 (not visible in FIG. 3) of work platform 20.

Upper clamp assemblies 90 are disposed above, and in general alignment with, said lower rollers 24. In a preferred embodiment, said upper clamp assemblies 90 comprise spacer bars 91 that are operationally attached to linear actuators 92. In the preferred embodiment, said linear actuators 92 comprise hydraulic fluid-powered cylinders, each comprising a barrel 93 and a piston 94 that can be selectively extended or retracted relative to said barrel 93. Said upper clamp assemblies 90 can be selectively raised and lowered relative to work platform 20 by selectively retracting or extending said pistons 94. In the embodiment depicted in FIG. 3, said upper clamp assemblies 90 are shown engaged against the upper surface of a pipe section 200 that is disposed on lower rollers 24.

A motor is operationally attached to said tandem lower rollers 24 to power rotation of said lower rollers 24. When a pipe joint 200 is disposed on said tandem rollers 24, rotation of said tandem rollers causes rotation of said pipe joint 200 about its longitudinal axis. The speed of such rotation can be controlled using with a power control apparatus. Hydraulic power unit 5 supplies hydraulic fluid to hydraulically-powered components of threaded connection repair assembly 100 of the present invention.

Elongate track members 30 extend from both ends of said work platform 20. Said track members 30 are oriented substantially parallel to the longitudinal axis of work platform 20 and support truss assembly 10. Box-end machining assembly 50 is moveably disposed on track members 30 at one end of said work platform 20, while pin-end machining assembly 70 is moveably disposed at the opposite end of said work platform 20. At least one kicker-plate assembly 40 is disposed at desired location along the length of said work platform 20.

Figure 4:
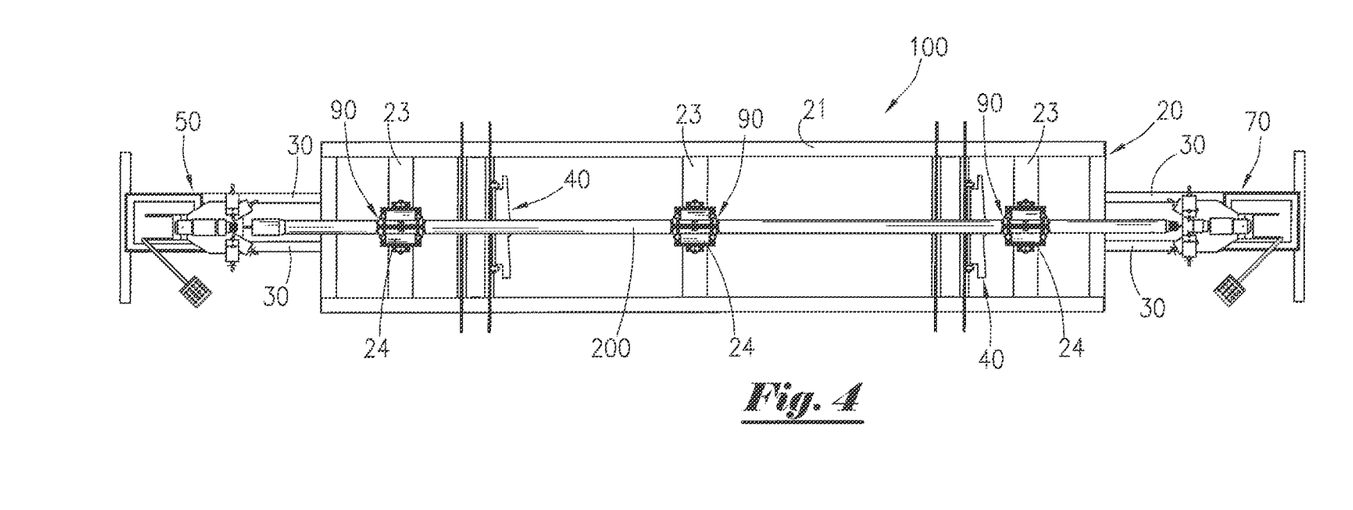
FIG. 4 depicts a sectional view of the threaded pipe connection repair (re-facing) assembly of the present invention along line 4-4 of FIG. 3.

FIG. 4 depicts a sectional view of the threaded pipe connection repair (re-facing) assembly of the present invention along line 4-4 of FIG. 3. Elongate work platform 20 has substantially flat upper surface 21. A plurality of cross supports 23 extend across said work platform 20 and are oriented substantially perpendicular to the longitudinal axis of said work platform 20.

Elongate track members 30 extend from both ends of said work platform 20. Box-end machining assembly 50 is disposed on track members 30 at one end of said work platform 20, while pin-end machining assembly 70 is disposed at the opposite end of said work platform 20. Pipe joint 200 is disposed on work platform 20. Upper clamp assemblies 90 are disposed above said pipe joint 200, and in general alignment with, said lower rollers 24 (not clearly visible in FIG. 4). Upper clamp assemblies 90 are disposed on the upper surface of said pipe joint 90. Kicker-plate assemblies 40 are disposed in spaced relationship along the length of said work platform 20.

Figure 5:
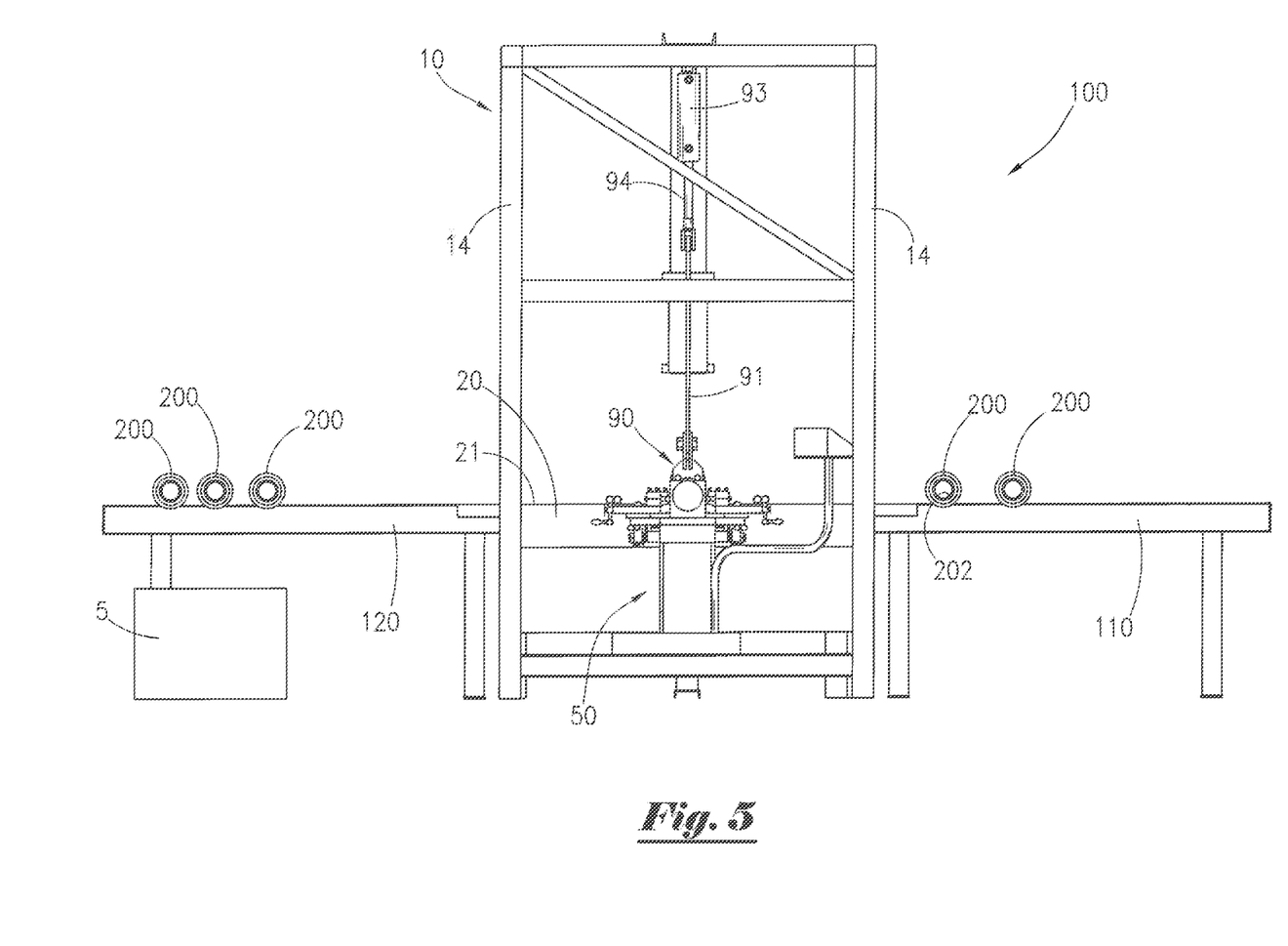
FIG. 5 depicts an end view of the threaded pipe connection repair (re-facing) assembly of the present invention.

FIG. 5 depicts an end view of the threaded pipe connection repair assembly 100 of the present invention. Elevated support truss assembly 10 is supported by vertical leg members 14 above work platform 20. Work platform 20 having substantially flat upper surface 21 is disposed under, and oriented in substantial alignment with, said support truss assembly 10. Upper clamp assemblies 90 are depicted in the extended or lowered position, as when they are engaged with a pipe joint 200 disposed on said work platform 20.

Said upper clamp assemblies 90 comprise spacer bars 91 operationally attached to linear actuators 92. Said linear actuators comprise hydraulic fluid-powered cylinders, each comprising a barrel 93 and a piston 94 that can be selectively extended or retracted relative to said barrel 93. In this manner, said upper clamp assemblies 90 can be selectively raised and lowered relative to work platform 20, and any pipe joint 200 disposed thereon, by selectively retracting or extending said pistons 94. Box-end machining assembly 50 is moveably disposed at an end of said work platform 20.

Input pipe racks 110 and output pipe racks 120 are both positioned adjacent to table-like work platform 20. In the embodiment depicted in FIG. 5, a plurality of pipe joints 200, each having a box-end (female) threaded connection member 202 at one end, are disposed on the upper surface of said input pipe racks 110 and output pipe racks 120. In the configuration depicted in FIG. 5, a plurality of pipe joints 200 needing repair or re-facing are disposed on input pipe racks 110, while pipe joints 200 that have already been repaired/re-faced are disposed on output pipe racks 120. An optional slope plate, well known to those having skill in the art, can be installed on input pipe rack 110 to selectively gravity feed pipe joints 200 to work platform 20.

Figure 6:
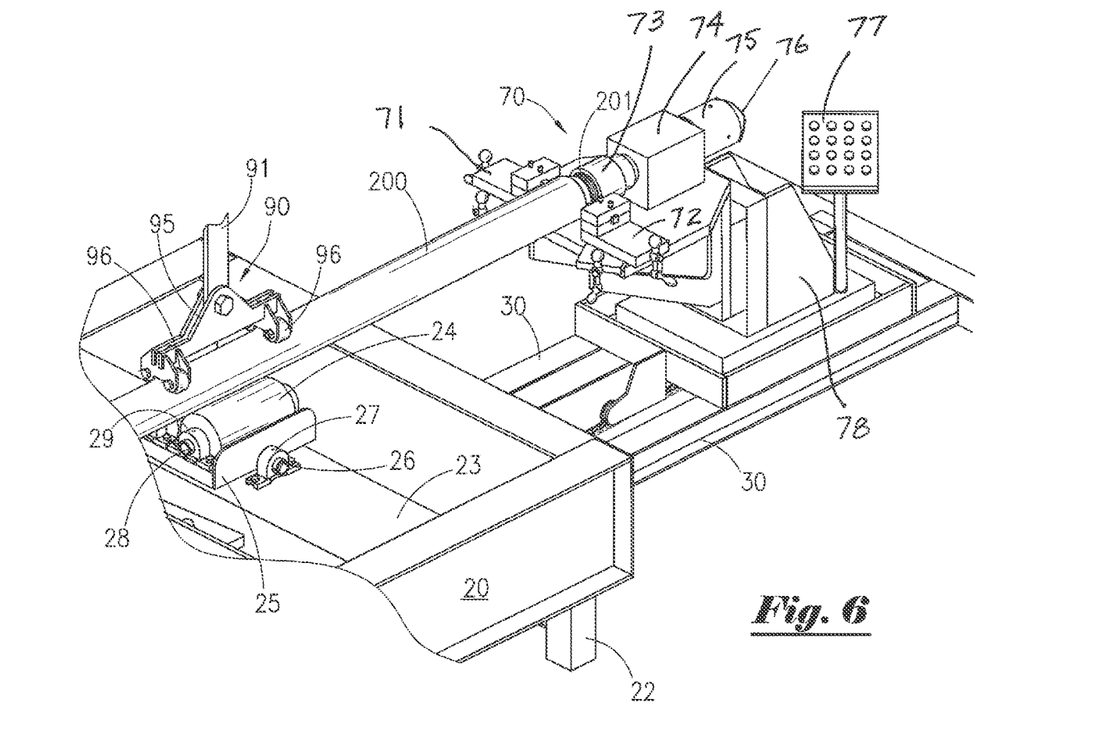
FIG. 6 depicts a side perspective view of a pin-end (male) connection machining station of the present invention.

FIG. 6 depicts a side perspective view of a portion of threaded pipe connection repair assembly 100, including pin-end (male) connection machining assembly 70. Work platform 20 comprises a table-like structure supported by a plurality of leg members 22. A plurality of cross supports 23 extend across said work platform 20 and are oriented substantially perpendicular to the longitudinal axis of said work platform 20. Lower rollers 24 are pivotally disposed on cross supports 23 of work platform 20, and pipe joint 200 is disposed on said lower rollers 24.

As depicted in FIG. 6, a plurality (typically two) tandem lower rollers 24 are positioned adjacent to one another with their rotational axes oriented parallel to each other; central roller shaft 28 (of each roller 24) is mounted to roller mounting housing 25 using mounting bracket 29. Further, said rollers 24 are positioned to permit a pipe joint 200 to rest on said parallel lower rollers 24, including any space formed there between. It is to be observed that parallel lower rollers 24 can accommodate a large range of pipe sizes/outer diameters. Roller mounting housing 25 is pivotally disposed on cross support 23 using pivot pin 26 rotationally disposed within mounting bracket 27.

Upper clamp assembly 90 is disposed above, and in general alignment with, said lower rollers 24. In a preferred embodiment, bracket mounting head 95 is disposed at the lower end of spacer bar 91. A plurality of rollers 96 are rotationally mounted to roller mounting head 95. In the embodiment depicted in FIG. 6, said upper clamp assemblies 90 are shown engaged against the upper surface of a pipe section 200. Further, rollers 96 each rotate around a central rotational axis that is substantially parallel with the rotational axes of lower rollers 24 and pipe joint 200.

As depicted in FIG. 6, lower rollers 24 can impart torque forces to pipe section 200, thereby causing said pipe joint 200 to rotate about its longitudinal axis, while upper clamp assemblies 90 act to secure said rotating pipe section 200 against said lower rollers 24 during thread repair/re-facing operations. Elongate track members 30 extend from the end of said work platform 20, while pin-end machining assembly 70 is moveably disposed on said elongate tracks 30.

Still referring to FIG. 6, pin-end (male) connection machining assembly 70 further comprises bevel diameter marking slide assembly 71, and facing and beveling slide assembly 72; said slide assemblies 71 and 72 can be used to align cutting elements of connection machining assembly 70 relative to pipe section 200 (and, more specifically, threaded connection member 201). Said pin-end (male) connection machining assembly 70 further comprises pin end alignment mandrel 73, spindle assembly 74, hydraulic spindle drive motor 75 and hydraulic spindle brake 76. Vertical adjustment of said components (including, without limitation, pin end alignment mandrel 73 and spindle assembly 74) relative to pipe section 200 and threaded connection member 201 can be made using vertical spindle adjustment slide member 78. Operation of threaded pipe connection repair assembly 100 including, without limitation, pin-end (male) connection machining assembly 70 and subsystems thereof can be controlled using control panel 77.

Figure 7:
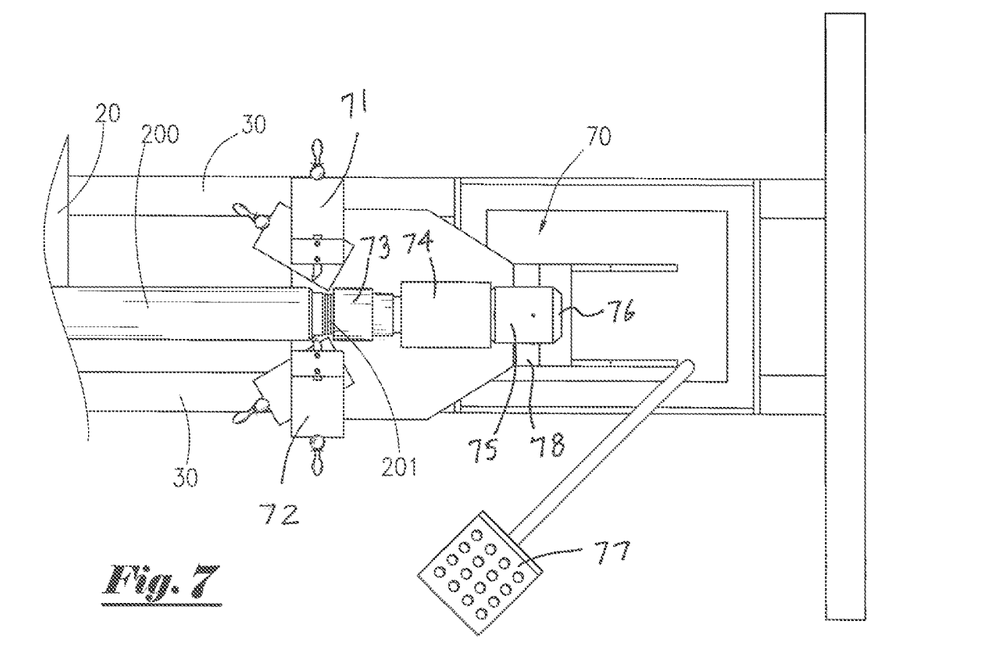
FIG. 7 depicts an overhead view of a pin-end (male) connection machining station of the present invention.

FIG. 7 depicts an overhead view of a portion of threaded pipe connection repair assembly 100, including pin-end (male) connection machining assembly 70. Elongate track members 30 extend from the end of said work platform 20, while pin-end machining assembly 70 is moveably disposed on said elongate tracks 30. When positioned on lower rollers 24, pipe joint 200 is generally stationary in the axial direction and prevented from axial movement. However, moveable pin-end machining assembly 70 can travel along tracks 30 in order to selectively move toward or away from said pipe joint 200.

Pin-end (male) connection machining assembly 70 comprises adjustable bevel diameter marking slide assembly 71 and facing and beveling slide assembly 72. Said machining assembly further comprises end alignment mandrel 73 (which can include cutting tools), spindle assembly 74, hydraulic spindle drive motor 75 and hydraulic spindle brake 76. Vertical spindle adjustment slide member 78 controls vertical positioning of said machining components relative to pipe section 200 (and, more specifically, male threaded connection member 201). Control panel 77 permits operational control of threaded pipe connection repair assembly 100 including, without limitation, pin-end (male) connection machining assembly 70 and subsystems thereof.

Figure 8:
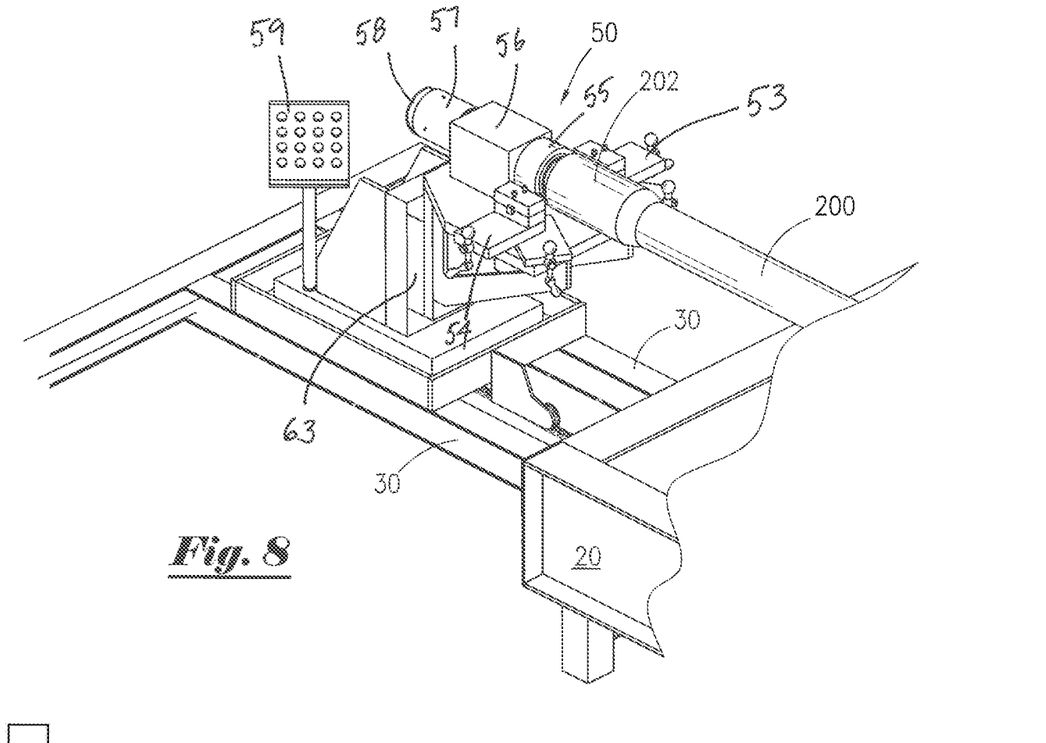
FIG. 8 depicts a side perspective view of a box-end (female) connection machining station of the present invention.
Figure 9:
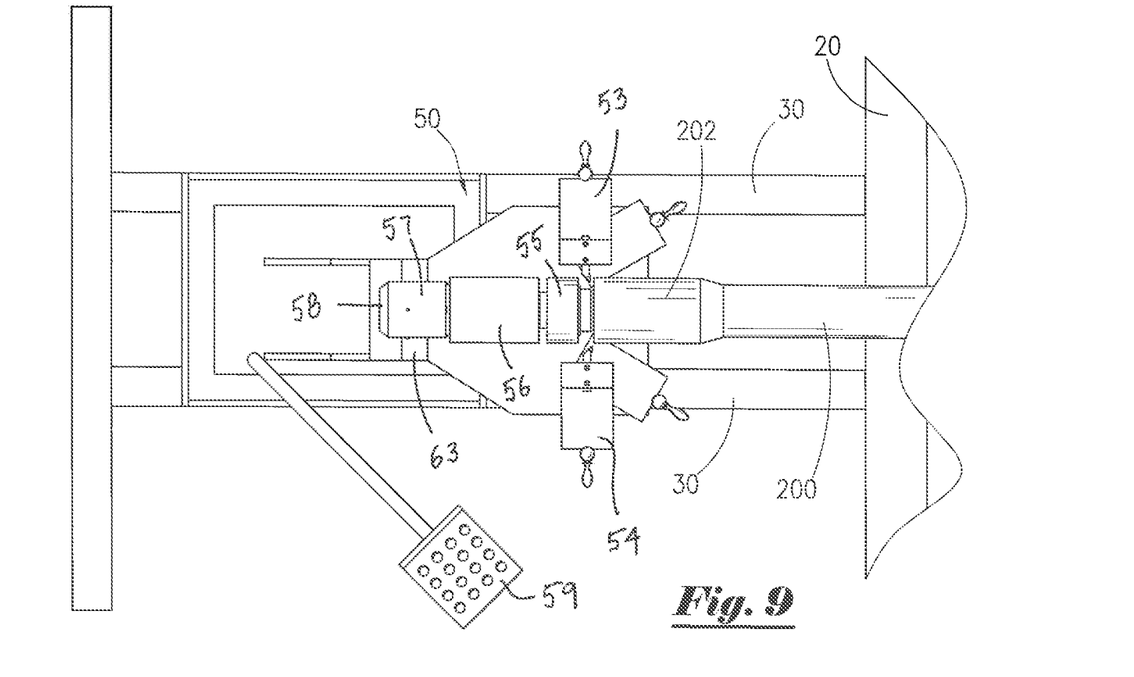
FIG. 9 depicts an overhead view of a box-end (female) connection machining station of the present invention.

FIG. 8 depicts a side perspective view of a portion of threaded pipe connection repair assembly 100, including box-end (female) connection machining assembly 50, while FIG. 9 depicts an overhead view of said portion of threaded pipe connection repair assembly 100 including box-end (female) connection machining assembly 50. When positioned on lower rollers 24, pipe joint 200 is generally stationary and prevented from axial movement. Moveable box-end (female) connection machining assembly 50 can travel along tracks 30 in order to selectively move toward or away from said pipe joint 200, as desired.

Box-end (male) connection machining assembly 50 further comprises bevel diameter marking slide assembly 53, and facing and beveling slide assembly 54; said slide assemblies 53 and 54 can be used to align cutting elements of connection machining assembly 50 relative to pipe section 200 (and, more specifically, threaded female box-end connection member 202). Said box-end (female) connection machining assembly 50 further comprises box end alignment mandrel 55 (which can include cutting tools), spindle assembly 56, hydraulic spindle drive motor 57 and hydraulic spindle brake 58. Vertical adjustment of said components (including, without limitation, box end alignment mandrel 55 and spindle assembly 56) relative to pipe section 200 and threaded connection member 202 can be made using vertical spindle adjustment slide member 63. Operation of threaded pipe connection repair assembly 100 including, without limitation, box-end (female) connection machining assembly 50 and subsystems thereof can be controlled using control panel 59.

Figure 10:
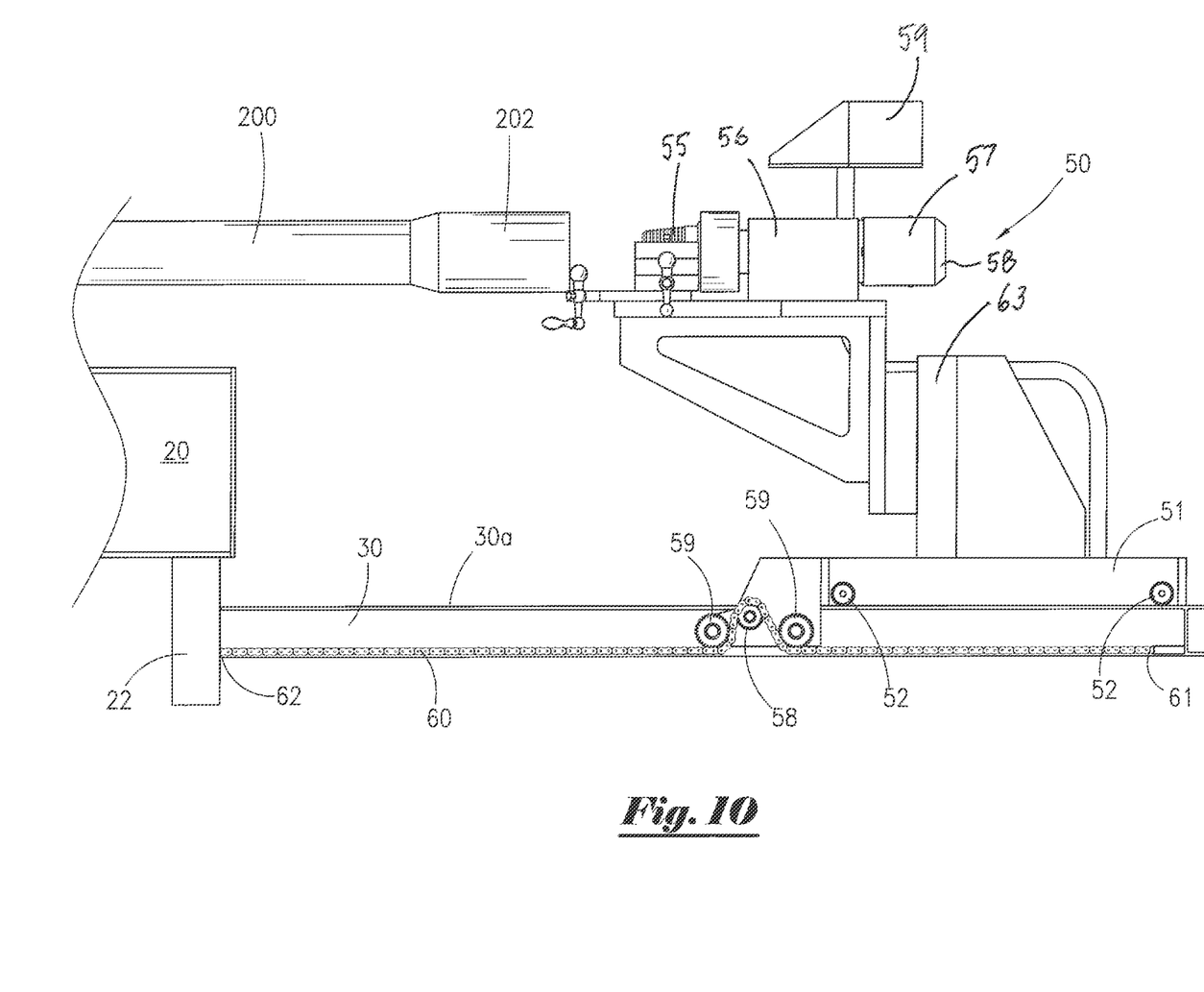
FIG. 10 depicts a side perspective view of a box-end (female) connection machining station of the present invention.

FIG. 10 depicts a side view of a portion of threaded pipe connection repair assembly 100, including box-end (female) connection machining assembly 50. As noted above, moveable box-end (female) connection machining assembly 50 can travel along tracks 30 in order to selectively move toward or away from said pipe joint 200, as desired. In a preferred embodiment, said moveable box-end (female) connection machining assembly 50 includes lower carriage base 51 having base rollers 52 disposed on substantially flat upper surface 30a of tracks 30.

Drive chain 60 is anchored at first end 61 and second end 62. Powered drive sprocket 58, together with follower sprockets 59, are rotatably attached to carriage base 51 of said moveable box-end (female) connection machining assembly 50 and engage with drive chain 60. Rotation of said powered drive sprocket 58 causes said carriage base 51 of said moveable box-end (female) connection machining assembly 50 to selectively move along the length of tracks 30, while base rollers 52 reduce frictional forces observed between carriage base 51 and substantially flat upper surface 30a of tracks 30.

Although not depicted in FIG. 10, it is to be observed that moveable pin-end connection machining assembly 70 also includes a substantially similar chain drive assembly. As such, moveable pin-end (male) connection machining assembly 70 can likewise travel along tracks 30 in order to selectively move toward or away from said pipe joint 200, as desired. Additionally, both box-end (female) connection machining assembly 50 and moveable pin-end (male) connection machining assembly 70 further comprise level/position adjustment means to permit selective alignment with said machining assemblies relative to pipe joint 200 and threaded connection members thereof.

Figure 11:
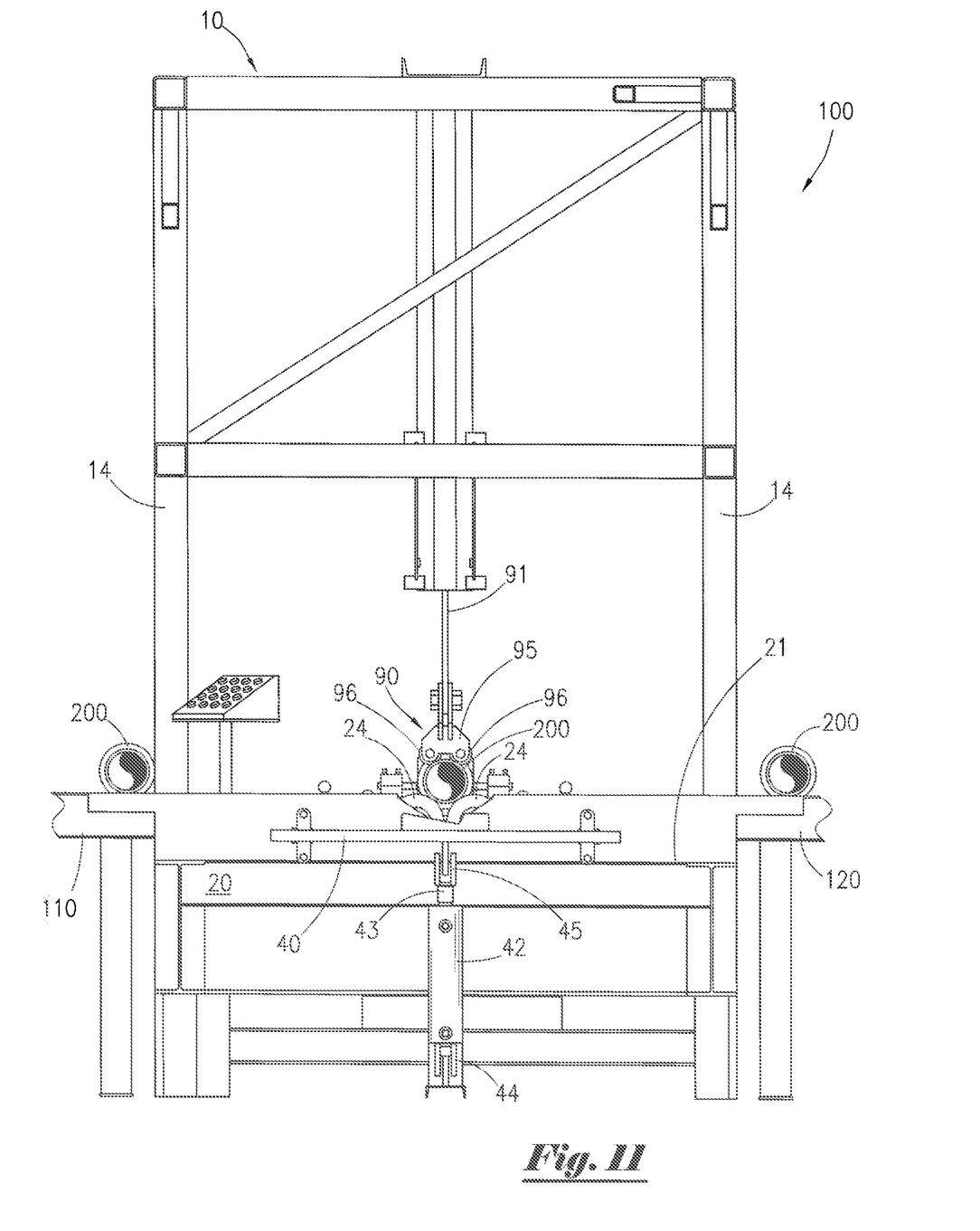
FIG. 11 depicts a sectional end view of the threaded pipe connection repair (re-facing) assembly of the present invention along line 11-11 of FIG. 3 in a first position.

FIG. 11 depicts a sectional end view of the threaded pipe connection repair (re-facing) assembly 100 of the present invention along line 11-11 of FIG. 3 in a first position. Elevated support truss assembly 10 is supported by vertical leg members 14 above work platform 20. Work platform 20 having substantially flat upper surface 21 is disposed under, and oriented in substantial alignment with, said support truss assembly 10. Tandem lower rollers 24 are pivotally disposed on work platform 20, and pipe joint 200 is disposed on said lower rollers 24.

Upper clamp assembly 90 is disposed above, and in general alignment with, said tandem lower rollers 24. Said upper clamp assembly 90 comprises a spacer bar 91; referring to FIG. 5, said spacer bar 91 is operationally attached at its upper end to a movable piston 94 of a fluid powered cylinder, while bracket mounting head 95 is disposed at the lower end of spacer bar 91. A plurality of rollers 96 are rotationally mounted to roller mounting head 95. Said upper clamp assembly 90 can be selectively raised and lowered relative to pipe joint 200; in the configuration depicted in FIG. 11, said upper clamp assembly 90 is shown engaged against the upper surface of a pipe section 200.

Still referring to FIG. 11, input pipe rack 110 and output pipe rack 120 are both positioned laterally adjacent to table-like work platform 20. A plurality of pipe joints 200 are disposed on the upper surface of said input pipe rack 110 and output pipe rack 120. A plurality of pipe joints 200 having connections needing repair or re-facing are disposed on input pipe rack 110, the single pipe joint disposed on lower rollers 24 is in position to be repaired, while pipe joints 200 that have already been repaired/re-faced are disposed on output pipe rack 120. Kicker plate 40 is pivotally attached work platform 20.

Figure 12:
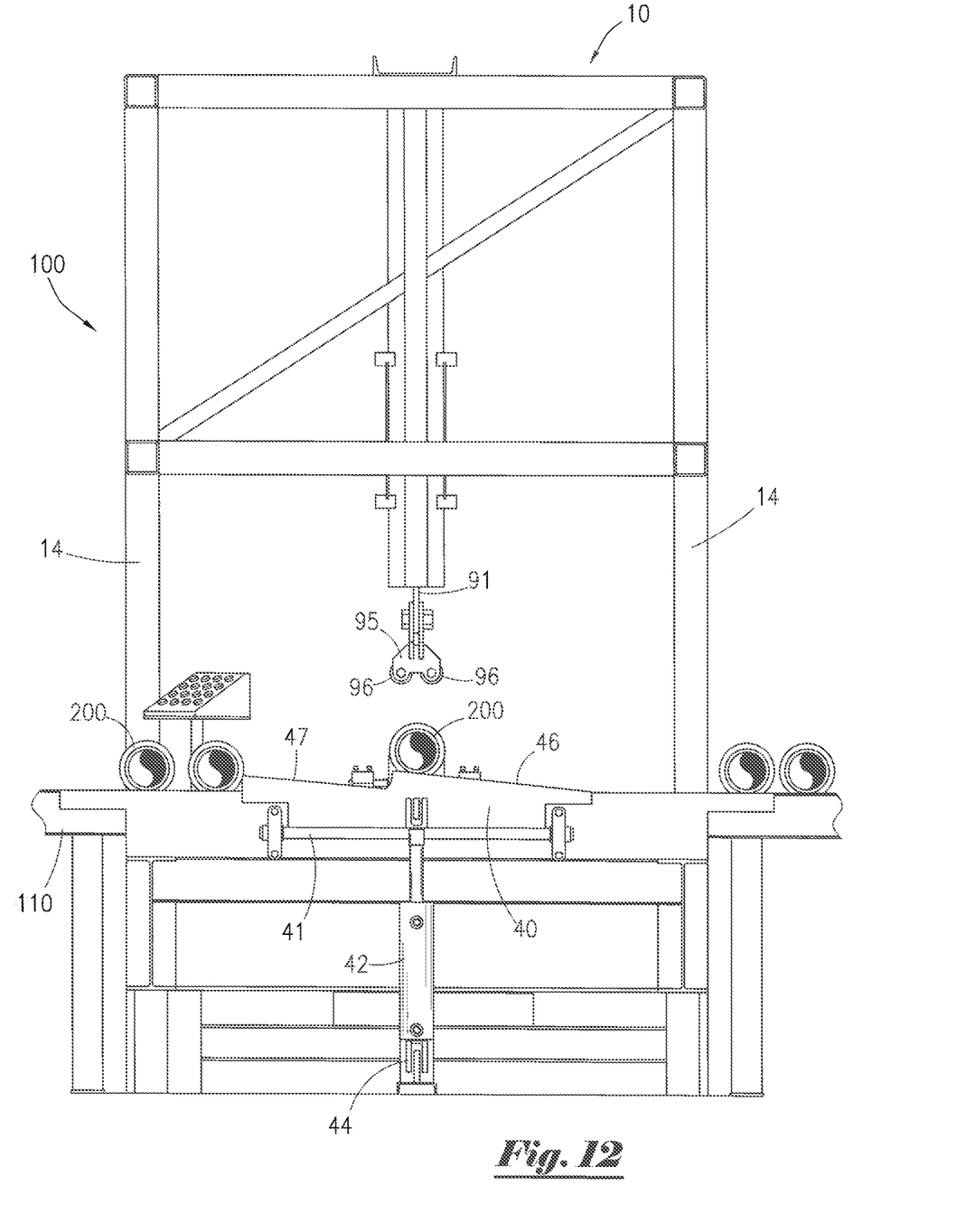
FIG. 12 depicts a sectional end view of the threaded pipe connection repair (re-facing) assembly of the present invention as depicted in FIG. 11 in a second position.

FIG. 12 depicts a sectional end view of the threaded pipe connection repair (re-facing) assembly 100 of the present invention along line 11-11 of FIG. 3 in a first position. In the preferred embodiment, said kicker plate 40 is pivotally connected to a linear actuator comprising a hydraulic fluid-powered cylinder, comprising a barrel 42 and a piston 43 that can be selectively extended or retracted relative to said barrel 42. Said barrel 42 is attached to work platform 20 using lower clevis bracket 44, while piston 43 is pivotally attached to kicker plate 40 via upper clevis bracket 45. When said cylinder piston 43 is extended, kicker plate 40 rotates about shaft 41 and moves upward; conversely, when said cylinder piston 43 is retracted, said kicker plate 40 rotates about shaft 41 and moves downward (as depicted in FIG. 11).

Upper clamp assembly 90 is raised, and is not in contact with pipe joint 200 that is positioned over tandem lower rollers 24. Cylinder piston 43 is extended, causing kicker plate 40 to rotate about shaft 41 and move upward. In this position, first slanted upper edge 46 contacts the underside of pipe joint 200 and lifts said pipe joint 200 off of said tandem lower rollers 24, thereby allowing said pipe joint 200 to gravity feed to output pipe rack 120. Similarly, a new pipe joint 200 is lifted on second slanted upper edge 47 of kicker plate 41; that pipe joint is gravity fed to tandem lower rollers 24 so that the process can be repeated.

In operation, pipe sections to be repaired are loaded onto pipe racks. Such pipe can be loaded and unloaded by hydraulic loading arms and rotated by supporting hydraulically driven cylindrical roller assemblies. Speed and torque are adjustable as required by pipe size and specifications. As a pipe section is repaired in said re-facing assembly 100, opposing hydraulically driven machining carriage assemblies 50 and 70 can engage with threaded (pin and box) connection members and perform such re-facing/repair operations.

Control panels 59 and 77 of the present invention permit efficient operation of the threaded pipe connection repair (re-facing) assembly 100 of the present invention. In a preferred embodiment, separate controls are provided for opposing hydraulically driven machining carriage assemblies 50 and 70, and use the same control legend plate. Said controls can be interlocked so that only one control or the other can be used at any particular time. All actions and/or functions associated with the re-facing apparatus of the present invention are completed by using the appropriate control functions.

After a pipe section is properly positioned within the threaded pipe connection repair (re-facing) assembly of the present invention, threaded connection member faces (pin and/or box ends) can be separately repaired or re-faced; in a preferred embodiment, said repair is performed using a lathe-type assembly equipped with carbide cutting tools well known to those having skill in the art. Connections at one or both ends of a pipe joint can be repaired as desired.

In conventional machine shops and/or pipe connection re-facing facilities, a lathe or other cutting assembly remains stationary and a pipe section (and threaded connection) to be repaired or re-faced is moved into alignment with said lathe or other cutting assembly. In the event that a connection member, such as a box-end female threaded connection member, is not precisely aligned with the centerline of said pipe joint, the re-facing (cutting) of said connection member will typically follow the centerline of the pipe section instead of the centerline of the connection member. As a result, the "mis-aligned" re-faced threads can exceed acceptable tolerances for threaded connection members.

By contrast, although a section of pipe (and threaded connections) can rotate, the pipe and connections otherwise remain substantially stationary in axial directions. Instead, machining carriage assemblies 50 and 70 can be moved or adjusted relative to said pipe and connection members. In the event that a connection member, such as a box-end female threaded connection member, is not precisely aligned with the centerline of said pipe joint, machining carriage assemblies 50 and/or 70 can be repositioned so that the re-facing (cutting) of said connection member can follow the centerline of the connection member being repaired (rather than the centerline of the pipe section). As a result, thread re-facing operations will stay true to the orientation of the threaded connection member, and the re-faced threads will not exceed acceptable tolerances or specifications for said threaded connection members.

The method and apparatus of the present invention can be used on virtually any size or configuration of pipe and other tubular good including, without limitation, drill pipe having outer diameters of 2⅜" thru 6⅝" drill pipe (range 2 and 3), as well as threaded connections that are misaligned with the centerline of a tube body. Further, the method and apparatus of the present invention can permit use of a double-shoulder re-facing machine for repair/re-facing of double shoulder threaded pipe connection members.

The method and apparatus of the present invention can be placed in line with a pipe inspection and/or storage facility for repairing (re-facing) of threaded connection members without requiring pipe or other tubular goods to be transported to a machine shop or other off-site location for repair/re-facing operations. In a preferred embodiment, a plurality of pipe sections (including, without limitation, those returning from prior use in the field) can be inspected; those sections requiring re-facing can be sent to the re-facing apparatus of the present invention for repair, while other sections passing inspection can be sent directly to storage.

Although other embodiments can be envisioned without departing from the scope of the present invention, in a preferred embodiment the present invention can be utilized at pipe storage or staging areas, ideally where pipe and threaded connection inspection operations occur. For example, the apparatus of the present invention can be installed and utilized in proximity to a pipe inspection facility, such that out-of-specification pipe connections can be repaired at said facility (rather than at an off-site or distant machine shop) without incurring significant transportation and/or machine shop (frequently third party) expenses.

The method and apparatus of the present invention reduces overall pipe re-facing/processing time by having pipe ready to be stored (and readily available for the next anticipated use), saves cost of transportation of large/heavy tubular goods to and from off-site or distant machine shops, and greatly enhances safety by reducing risks associated with loading, transportation and re-facing operations.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

The invention claimed is:

1. An apparatus for repairing or re-facing a pipe joint having a male threaded connection having at least one shoulder and a female threaded connection having at least one shoulder comprising;
   a) a support base;
   b) at least one set of tandem rollers disposed on said support base and configured to receive said pipe joint on said tandem rollers;
   c) a first moveable machining assembly configured to alternate between a first position and a second position, wherein said first machining assembly is separated from said male threaded connection in said first position, and engaged against said male threaded connection in said second position;
   d) a first cutting element operationally attached to said first moveable machining assembly and adapted to reface at least one shoulder of said male threaded connection, wherein said first cutting element remains aligned with a centerline of said male threaded connection in said second position regardless of centerline orientation of said pipe joint;
e) a second moveable machining assembly configured to alternate between a first position and a second position, wherein said second machining assembly is separated from said female threaded connection in said first position, and engaged against said female threaded connection in said second position; and
f) a second cutting element operationally attached to said second moveable machining assembly and adapted to reface at least one shoulder of said female threaded connection, wherein said second cutting element remains aligned with a centerline of said female threaded connection in said second position regardless of centerline orientation of said pipe joint.

2. The apparatus of claim 1, further comprising a support truss disposed above said support base.

3. The apparatus of claim 2, further comprising at least one clamping assembly operationally attached to said support truss.

4. The apparatus of claim 3, wherein said at least one clamping assembly is configured to alternate between a first position and a second position, wherein said clamping assembly is separated from said pipe joint in said first position, and engaged against said pipe joint in said second position.

5. The apparatus of claim 1, further comprising a motor configured to power rotation of said at least one set of tandem rollers and rotate said pipe joint on said tandem rollers.

6. The apparatus of claim 1, further comprising:
a) an input pipe rack aligned with a work table and configured to load pipe joints to be repaired on said support base; and
b) an output pipe rack aligned with said work table and configured to load pipe joints that have been repaired from said support base.

7. An apparatus for repairing a pipe joint having a male threaded connection having at least one shoulder and a female threaded connection having at least one shoulder comprising;
a) a support base having a first end, a second end and a length;
b) a support truss disposed above said support base;
c) at least one set of tandem rollers disposed on said support base and configured to receive a pipe joint on said tandem rollers;
d) a first track extending from said first end of said support base;
e) a first machining assembly moveably disposed on said first track and configured to alternate between a first position and a second position, wherein said first machining assembly is separated from said male threaded connection in said first position, and engaged against said male threaded connection in said second position;
f) a first cutting element operationally attached to said first machining assembly and adapted to reface at least one shoulder of said male threaded connection, wherein said first cutting element remains aligned with a centerline of said male threaded connection in said second position regardless of centerline orientation of said pipe joint;
g) a second track extending from said second end of said support base;

h) a second moveable machining assembly moveably disposed on said second track and configured to alternate between a first position and a second position, wherein said second machining assembly is separated from said female threaded connection in said first position, and engaged against said female threaded connection in said second position;
i) a second cutting element operationally attached to said second machining assembly and adapted to reface at least one shoulder of said female threaded connection, wherein said second cutting element remains aligned with a centerline of said female threaded connection in said second position regardless of centerline orientation of said pipe joint.

8. The apparatus of claim 7, further comprising at least one clamping assembly operationally attached to said support truss.

9. The apparatus of claim 8, wherein said at least one clamping assembly is configured to alternate between a first position and a second position, wherein said clamping assembly is separated from said pipe joint in said first position, and engaged against said pipe joint in said second position.

10. The apparatus of claim 7, further comprising a motor configured to power rotation of said at least one set of tandem rollers and rotate said pipe joint on said tandem rollers.

11. The apparatus of claim 7, further comprising:
a) an input pipe rack aligned with a work table and configured to load pipe joints to be repaired on said support base; and
b) an output pipe rack aligned with said work table and configured to load pipe joints that have been repaired from said support base.

12. A method for repairing threaded connections of pipe joints having a male threaded connection having at least one shoulder and a female threaded connections having at least one shoulder comprising:
a) delivering a first pipe joint to a repair apparatus, wherein said repair apparatus comprises:
i) a support base;
ii) at least one set of tandem rollers disposed on said support base and configured to receive said pipe joint on said tandem rollers;
iii) a first moveable machining assembly configured to alternate between a first position and a second position, wherein said first machining assembly is separated from said male threaded connection in said first position, and engaged against said male threaded connection in said second position;
iv) a first cutting element operationally attached to said first moveable machining assembly and adapted to reface at least one shoulder of said male threaded connection, wherein said first cutting element remains aligned with a centerline of said male threaded connection in said second position regardless of centerline orientation of said pipe joint;
v) a second moveable machining assembly configured to alternate between a first position and a second position, wherein said second machining assembly is separated from said female threaded connection in said first position, and engaged against said female threaded connection in said second position
vi) a second cutting element operationally attached to said second moveable machining assembly and adapted to reface at least one shoulder of said female threaded connection, wherein said second cutting element remains aligned with a centerline of said female threaded connection in said second position regardless of centerline orientation of said pipe joint;

b) repairing at least one shoulder of at least one threaded connection of said pipe joint;

c) removing said first pipe joint from said support base; and d) delivering a second pipe joint to said support base.

13. The method of claim 12, wherein said repair apparatus further comprises a support truss disposed above said support base.

14. The method of claim 13, wherein said repair apparatus further comprises at least one clamping assembly operationally attached to said support truss, and wherein said at least one clamping assembly is configured to alternate between a first position engaged against said first pipe joint and a second position separated from said pipe.

15. The method of claim 12, wherein said repair apparatus further comprises a motor configured to power rotation of said at least one set of tandem rollers and rotate said pipe joint on said tandem rollers.

16. The method of claim 12, wherein said repair apparatus further comprises:

a) an input pipe rack aligned with a work table; and b) an output pipe rack aligned with said work table.

17. The method of claim 12, wherein said repair apparatus is installed at a pipe storage facility or pipe inspection facility.

* * * * *